United States Patent

[11] 3,528,338

| [72] | Inventors | Anthony J. Cuma<br>Hinsdale, Illinois;<br>Kenneth W. Maurer, Blue Island, Illinois |
|---|---|---|
| [21] | Appl. No. | 711,749 |
| [22] | Filed | March 8, 1968 |
| [45] | Patented | Sept. 15, 1970 |
| [73] | Assignee | Continental Can Company, Inc.<br>New York, New York<br>a corporation of New York |

[54] METHOD AND APPARATUS FOR CLEANING WORKPIECE EDGES
22 Claims, 6 Drawing Figs.

[52] U.S. Cl. ............................................... 90/17,
51/76, 51/80, 90/11, 90/21
[51] Int. Cl. ............................................ B23c 3/12
[50] Field of Search .................................. 90/21,
21.02, 11, 17, 24, 24.06; 51/74, 76, 78, 80, 87

[56] References Cited
UNITED STATES PATENTS

| 1,544,185 | 6/1925 | Schnell.......................... | 51/74 |
| 1,607,193 | 11/1926 | Fountain ........................ | 90/17 |
| 1,703,141 | 2/1929 | Fountain ........................ | 90/21 |
| 2,176,939 | 10/1939 | Woolford ....................... | 51/76 |
| 2,353,994 | 7/1944 | Chapman et al. .............. | 90/17 |
| 3,192,834 | 7/1965 | Laine ............................. | 90/17 |
| 3,283,665 | 11/1966 | Hobbs ........................... | 90/24 |

Primary Examiner—Gerald A. Dost
Attorney—Diller, Brown, Ramik and Holt

ABSTRACT: A method and apparatus for cleaning workpiece edge portions are disclosed wherein a thin metallic blank or workpiece is conveyed along a predetermined path, rotary file members are disposed along that path and extend into contact with the edge portions of the blank lying parallel to the path and disposed upon upper and lower surfaces of the blank. The rotary file members are disposed angularly with respect to the direction of movement of the edge portions to define an acute angle between the axis of rotation thereof and such direction of movement and the file members are rotated in a direction to provide climb cutting of the edge portions in contact therewith. Relieved areas lying opposite the file members allow flexure of the blank edge portions in response to cutting pressure applied thereto via the file members.

Patented Sept. 15, 1970
3,528,338
Sheet 1 of 2
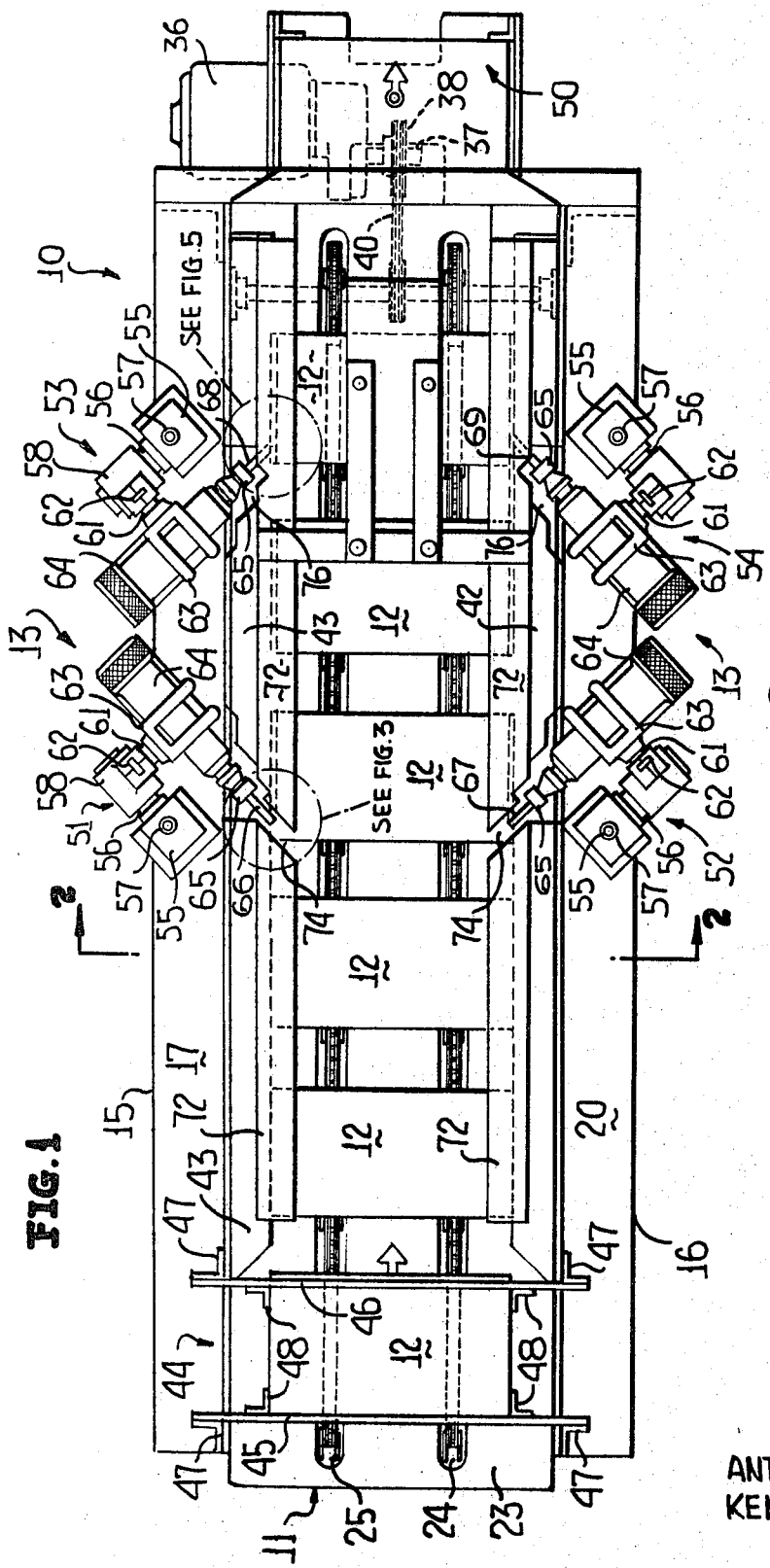
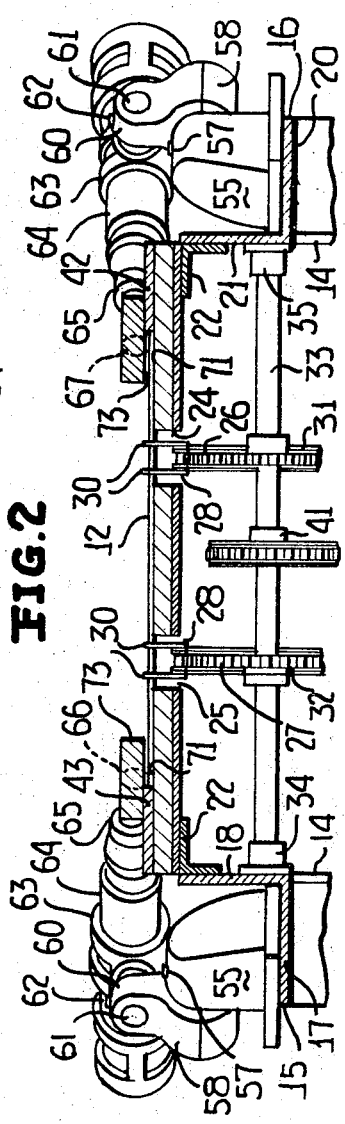
INVENTORS
ANTHONY J. CUMA &
KENNETH W. MAURER
BY
Mason, Porter, Weller & Brown
ATTORNEYS

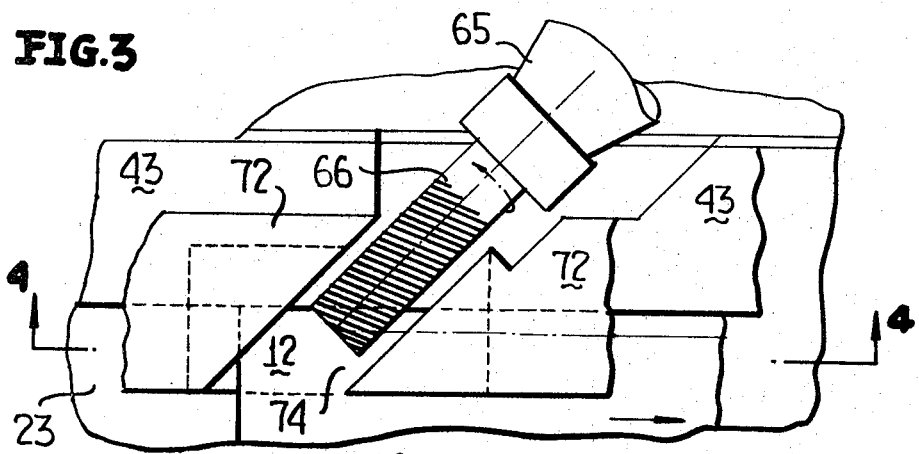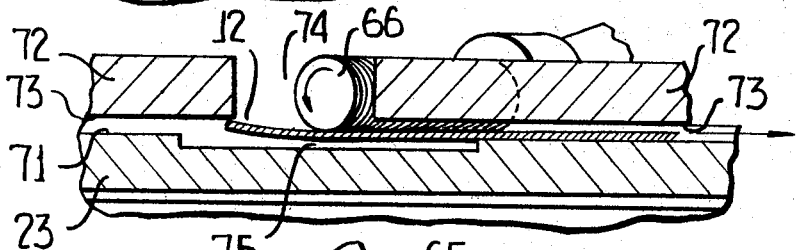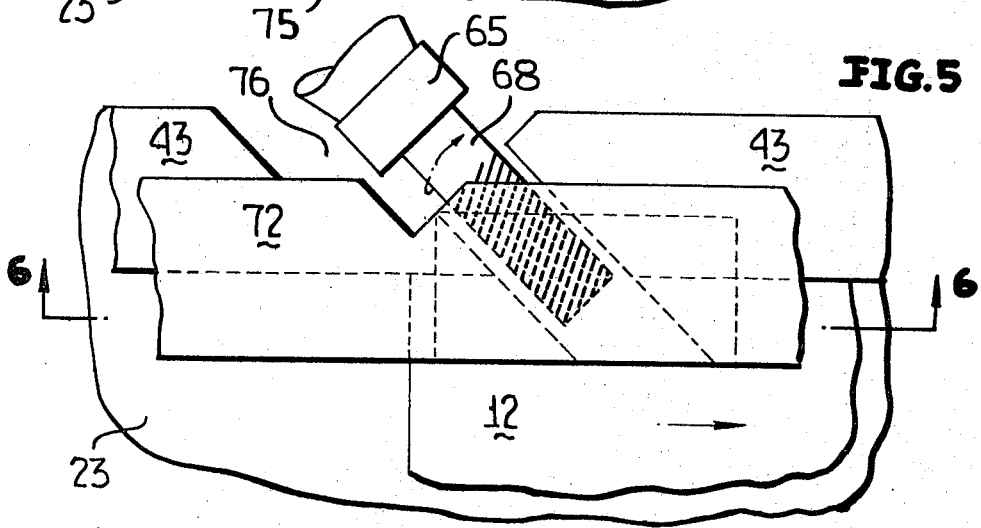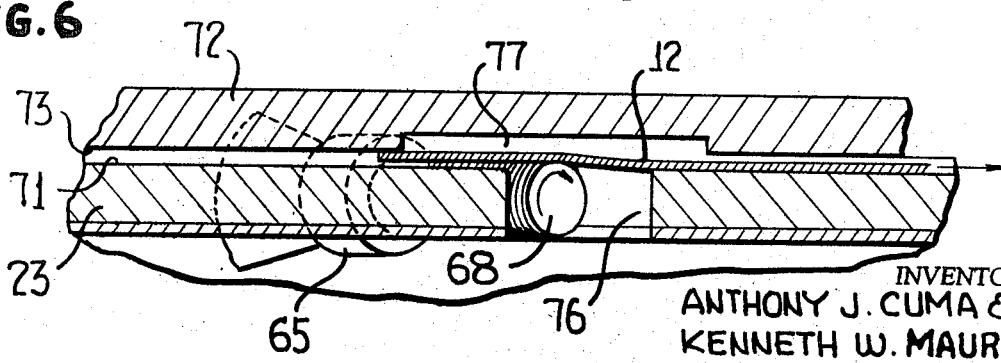

METHOD AND APPARATUS FOR CLEANING WORKPIECE EDGES

This invention relates generally to methods and apparatus for cleaning metallic workpiece edge portions during the passage thereof along a conveyor, and more particularly to the high speed cleaning of an elongate edge portion of a can body blank prior to the welding of such blank into a cylindrical can body.

Prior to the welding of generally flat, rectangular can body blanks into tubular can bodies by the bringing together of edge portions of the blanks and the welding together of such edge portions, it is necessary to clean the edge portions which are to be welded of all foreign matter and to a width determined in accordance with the welding operation to which the edge portions are to be subjected. In edge cleaning can body blanks prior to the welding thereof, it is desirable to effect the cleaning operation at a relatively high rate of speed sufficient to meet the requirements of production welding apparatus while maintaining relatively straight, clean and smooth margins along the surfaces of the can body to be subjected to the welding operation without the removal of an excessive amount of metal along the cleaned edges of the body. The required removal of all enamels, chromates, oxidation and like foreign matter from can body blank marginal areas prior to the welding thereof has resulted in the attempted utilization of various cleaning methods including chemical baths, rotary grinding provisions and flap wheel cleaning provisions. However, such attempts have been generally unsuitable to meet the combined requirements of thorough cleaning, high speed, precise margin widths, smooth marginal surfaces and minimization of the removal of metal from the marginal areas.

In accordance with the foregoing, it is a primary object of this invention to provide a method of cleaning workpiece edge portions through the climb-cut milling of an edge portion of a blank during the conveyance of the blank along a predetermined path.

It is another object of this invention to provide an apparatus for cleaning workpiece edge portions in accordance with the foregoing object and including conveying provisions for moving the blanks along the aforementioned predetermined path and rotary milling means extending into the path for contacting the edge portion to be cleaned and for providing the climb-cutting of that edge portion.

A further object of this invention is to provide a method of cleaning workpiece edge portions including the step of contacting the edge portion to be cleaned with a rotary milling tool rotating about an axis forming an acute angle with the path along which the workpiece edge portion is moving.

It is an additional object of this invention to provide apparatus for effecting the immediately foregoing object including provisions for conveying the workpiece along a predetermined path, a rotary file member extending partially into the path for contacting the edge portion to be cleaned and being mounted for rotation about an axis forming an acute angle with the path of movement of such edge portion.

Yet another object of this invention is to provide a method of cleaning workpiece edge portions during conveyance of a workpiece along a predetermined path and including the step of climb-cut milling a workpiece edge portion in a direction partially transverse to the direction of movement of the workpiece.

It is an additional object of this invention to provide apparatus for cleaning workpiece edge portions including provisions for conveying workpieces along a predetermined path, rotary milling means extending into the path for contacting the workpiece edge portion to be cleaned and mounted for rotation about an axis forming an acute angle with the path of movement of the workpiece edge portion and motive means for imparting rotational movement to the milling means in a direction to provide climb-cutting of the workpiece edge portion.

Yet another object of this invention is to provide a workpiece edge cleaning method in accordance with any of the aforementioned methods and including the further step of flexing the edge portion of the workpiece during the cleaning thereof to limit the removal of material from the workpiece edge portion.

Additionally, it is an object of this invention to provide apparatus in accordance with any of the foregoing objects and including workpiece guiding means defining a relieved area opposite the rotary milling means or rotary file member to allow deflection of the workpiece edge portion into such relieved area upon application of a cutting pressure to the workpiece edge portion.

Further still, it is an object of this invention to provide methods and apparatus in accordance with any of the foregoing objects and capable of cleaning workpiece edge portions at speeds commensurate with present-day production requirements.

With the above and other objects in view that will hereinafter appear, the nature of the invention will be more clearly understood by reference to the following detailed description, the appended claims, and the several views illustrated in the accompanying drawings.

In the drawings:

FIG. 1 is a top plan view of can body blank edge cleaning apparatus in accordance with this invention, and shows conveying apparatus for moving an plurality of can body blanks along a predetermined path and four rotary file provisions for cleaning upper and lower edge surface portions of can body blanks in transit therepast.

FIG. 2 is an enlarged fragmentary sectional view taken along the line 2—2 of FIG. 1, and shows the mounting of the rotary file provisions with respect to the can body blank conveying apparatus.

FIG. 3 is an enlarged fragmentary top plan view of a portion of the apparatus illustrated in FIG. 1, and shows the angular extension of a rotary file member into the path of movement of the can body blank for cleaning one upper edge portion surface.

FIG. 4 is an enlarged fragmentary sectional view taken along the line 4—4 of FIG. 3, and shows a can body blank support and guide member having a relieved area opposite the rotary file member.

FIG. 5 is an enlarged fragmentary top plan view of a portion of the apparatus shown in FIG. 1, and shows the angular extension of a rotary filed member inwardly into the path of movement of the can body blanks for cleaning a lower edge portion surface of such blanks.

FIG. 6 is an enlarged fragmentary sectional view taken along the line 6—6 of FIG. 5, and shows a further can body blank support and guide member having a further relieved area disposed opposite the lower surface cleaning rotary file member to allow the upward flexure of the blank in transit therepast.

Referring to the drawings in detail, indicated generally at 10 is a workpiece or can body blank conveying and edge cleaning combination including a conveyor, generally referred to by the numeral 11, for moving a number of can body blanks 12 along a predetermined path and passed an edge cleaning work station, generally referred to by the numeral 13.

In the preferred embodiment best seen in FIGS. 1 and 2 the conveyor 11 includes a plurality of generally upstanding support members 14 upon which is mounted a pair of generally horizontally disposed frame members 15, 16, each defining two normally joined support portions 17, 18 and 20, 21, respectively. A plurality of bracing provisions, such as the angle irons 22, support an elongate, flat and generally horizontally extending conveying table 23 through the interconnection of the table 23 with the vertically disposed support portions 18, 21, of the frame members 15 and 16. The conveying table 23 is provided with a pair of longitudinally extending slots or apertures 24 and 25. A pair of endless conveying chain members 26 and 27 are disposed below the upper surface of the conveying table 23 for movement in alignment with the longitudinally disposed slots 24 and 25, respectively, and a plurality of conveying lugs 28 and mounted upon the endless chain members 26 and 27. The lugs 28 are generally U-shaped, each having a pair of blank engaging arms 30 extending outwardly from the chain members upon which the lugs are mounted. The blank engaging arms 30 of the lugs 28 are of sufficient length to extend upwardly from the upper run of the endless chains 26 and 27, through the elongate apertures 24 and 25 and into engagement with the trailing edge of the blanks 12 to provide the serial conveyance of the blanks 12 along the upper surface of the conveying table 23.

The endless chain members 26 and 27 are, at one end thereof, entrained about a pair of drive sprockets 31 and 32, respectively, and the sprockets 31 and 32 are fixedly mounted upon a shaft 33 which is journaled for rotation in a pair of shaft support bearings 34, 35 mounted upon the interior surfaces of the upstanding support portions 18, 21 of the frame members 15 and 16. Similarly, the chains 26 and 27 are movably mounted at the remaining end thereof upon a further driven shaft and sprocket combination (not shown). Driving movement is imparted to the chains 26 and 27 to provide conveyance of the blanks 12 in the direction of the unnumbered arrows of FIG. 1 through the inclusion of a suitable selected motive source or motor 36, the output of which is supplied to an output shaft 37. A drive sprocket 38 fixedly mounted upon the output shaft 37 imparts driving movement to a primary drive chain 40 which is entrained about the sprocket 38 and a further sprocket 41 fixedly mounted upon the shaft 33. Selection of the speed of conveyance of the blanks 12 along the upper surface of the conveying table 23 may be provided through the utilization of suitably chosen gear box or speed control provisions interconnecting the motor 36 and the output shaft 37.

A pair of elongate lateral alignment members 42 and 43 extend along the longitudinally disposed edges of the conveying table 23 to define the limits of lateral movement of the blanks 12 during passage along the conveyor 11. A blank supply station, generally referred to by the numeral 44 is provided at the upstream end of the conveyor 11 for supplying can body blanks into engagement with the lugs 28 for movement of such blanks toward the edge cleaning work station 13 and the supply station 44 includes a pair of upstanding transversely disposed side walls 45, 46 suitably mounted to the conveyor frame members 15, 16 as by the utilization of the mounting brackets 47. A quantity of the can body blanks 12 are maintained between the walls 45 and 46 and initial transverse alignment of the blanks 12 is provided by the blank edge engaging guide brackets 48. The blanks 12, then, serially conveyed along the upper surface of the conveyor table 23 are precisely transversely aligned with the work station 13 prior to and during their passage therepast.

A depository 50 is provided at the downstream end of the conveyor 11 to receive and maintain a quantity of the prepared blanks after the passage of such blanks through the work station 13.

The edge cleaning work station 13 includes four angularly disposed blank edge cleaning provisions 51 through 54 for cleaning each of the four longitudinally disposed blank edge portion upper and lower surfaces during movement of each of the blanks 12 past the station 13. Each of the cleaning provisions 51 through 54 include a mounting trunnion 55 supported upon the horizontal upper surface of the supporting portions 17 and 20 of the frame members 15 and 16. The trunnions 55 each supports a mounting shaft 56 which is locked against rotation through the tightening of the setscrews 57 provided upon the trunnions 55. Each of the shafts 56 has mounted thereon a generally upwardly extending arm member 58 terminating in a shaft supporting clamp portion 60 in which is fixedly clamped a further upper support shaft 61 maintained against rotation by the tightening of suitably provided threaded clamp tightening setscrew provisions 62. Each of the shafts 61 support in cantilever fashion, a motor mount 63 in which is situated a suitably chosen and commercially available motor 64. The output shafts of the motors 64 are provided with tool grasping chucks 65 into which are inserted four rotary file members 66 through 69 for contacting and cleaning each of the blank edge portion upper and lower marginal surfaces.

Each of the rotary file members 66 through 69 extend to a limited degree into the path of movement of the blanks 12 along the conveyor 11 to clean a precisely determined marginal area of each of the edge surfaces during the movement of those edge surfaces past the edge cleaning work station 13. The disposition of the abrasive outer surfaces of the rotary file members 66 through 69 may be adjusted such that the abrasive surfaces of each of the file members contact the edge portions to be cleaned fully across the marginal width thereof. To this end, the motor mounts 63 may each be pivotally adjusted about the axis of the shaft 61 such that the surfaces of the file members 66 through 69 extend parallel to the associated blank edge surfaces to be cleaned. Similarly, pivotal adjustment of the generally upstanding arm members 58 about the mounting shaft 56 provides vertical adjustment of the file members 66 through 69. Additionally, releasing of the shafts 56 by the loosening of the setscrews 57 allows an upward swinging of the motors 64 for the easy replacement and subsequent realignment of each of the four file members.

In operation, can body blanks in transit along the conveyor 11 are first contacted along the upwardly facing edge portion marginal surface areas thereof by the rotary file members 66 and 67. Vertical displacement of the longitudinally extending edge portions of the blanks 12 is limited during movement thereof along the conveyor 11 by the upper surface areas 71 of the table 23 and a plurality of guide bars 72 supported upon the lateral alignment members 42 and 43 at each side of the path of movement of the blanks 12 to provide a plurality of lower surfaces 73 overlying the upwardly facing surfaces 71. The cooperating surfaces 71 and 73, then, provide edge guide provisions for maintaining the blank edge portions to be cleaned in the relatively limited area therebetween. Each of the lateral alignment members 42 and 43 and each of the guide bars 72 are broken adjacent the upstream rotary files 66 and 67 to provide a pair of openings 74, 74 allowing the rotary files 66 and 67 to be brought into contact with the upper edge portion surfaces of the blanks 12.

FIGS. 3 and 4 more clearly illustrate the disposition of the upstream rotary file members with respect to the blank edge guide provisions and, it will be noted, the edge guide surface 71 adjacent the lateral alignment member defines a relieved area 75 immediately below the file 66 to allow downward flexure of the edge portion of the blank 12 in contact with the file 66 into the relieved area 75 during cleaning of the upper edge portion surfaces of the blanks 12. A similar relieved area is, of course, provided opposite the file 67.

Similarly, adjacent each of the downstream milling provisions 53 and 54, the blank transverse alignment members 42 and 43 and the edge portions of the table 23 are broken away at 76 adjacent the rotary files 69 and 68 to allow extension of the downstream rotary files into cleaning contact with the lower blank edge portion surfaces of the blanks 12 in transit along the conveyor 11.

The disposition of the lower edge surface cleaning files 68 and 69 is best illustrated in FIGS. 5 and 6 wherein the location of the file 68 is shown extending into the opening 76 provided in the lateral alignment member 43 and the edge portion of the table 23. A relieved area 77 is provided in the downwardly facing edge guide surface 73 to allow upward flexure of a blank 12 during the cleaning of the lower marginal edge surface thereof by the rotary file 68. It will, of course, be understood that a relieved area similar to the relieved area 77 is provided opposite the rotary file 69 to allow upward flexure of the blank edge portions in transit past that file member.

Each of the rotary files 66 through 69 are vertically aligned with respect to the associated relieved areas 75 and 77 opposite those files to cause flexure of the blank edge portions into the relieved areas 75 and 77 under the application of the cleaning force imparted to the edge portions of the blanks 12 during contact with the file members. Thus, the resilience of the thin metallic blanks biases the edge portions to be cleaned into contact with each of the four rotary files 66 through 69 and the cleaning contact pressure exerted by the rotary files upon the blank edge portions is limited by the flexibility of the blanks such that the blanks 12 are cleaned fully across and along the length of the marginal edge surfaces and only a minimal amount of blank metal is removed during an edge cleaning operation. Additionally, the provision of the relieved areas 75 and 77 opposite the four rotary files decreases the need for frequent adjustment of the vertical positioning of the files inasmuch as wearing of the abrasive outer surfaces of the file members is compensated for in the use of the natural resilience of the blanks to bias the edge portions thereof into contact with the abrasive file surfaces.

Extremely clean, smooth blank edge portion surfaces satisfactory for use in cooperation with modern high speed can body welding apparatus are obtained through the angular disposition of the rotary files 66 through 69 so as to provide an abrasive or cleaning action partially transverse to the direction of feed of the blanks 12 and the smoothness of the cleaned surfaces produced at relatively high production speeds is enhanced by imparting to the file members 66 through 69, from the motors 64 a high speed of rotation in a climb-cutting direction. That is, each of the files 66 through 69 are rotated such that, at the line of contact, the abrasive file surfaces are moving relative to the blank surfaces in contact therewith in a direction having a component lying in the direction of feed of the blanks 12. The angular disposition of the file members causes the direction of movement at the line of contact of the abrasive surface of the files to have a component transverse to the direction of feed of the blanks 12. The rotational movement of the upper and lower edge surface cleaning files in relation to the direction of movement of the blanks 12 is best illustrated by the unnumbered arrows in FIGS. 3 through 6.

Highly satisfactory results have been obtained by the employment of the embodiment of FIGS. 1 through 6 utilizing air motors rated at 40,000 R.P.M. as the motors 64 and either ¼" diameter carbide midget mills or high speed steel midget mills as the rotary files 66 through 69. In this arrangement, cleaned blank edge surface margins of substantially constant width were obtained at blank feed speeds up to 1,800 inches per minute during energization of the air motors from a 90 P.S.I. source providing a free operating speed of the air motors at approximately 30,000 R.P.M.

Similarly, the utilization of electric motors for the motors 64 to impart a rotary speed of 45,000 R.P.M. to a set of 4¼ inch diameter carbide midget mills while maintaining a feed speed of 2,250 inches per minute resulted in straight, smooth and clean marginal surface areas such that high quality can bodies were obtained through the welding of the cleaned edge portions of the blanks.

In each of the foregoing arrangements, the axis of rotation of the rotary file members 66 through 69 were disposed at an angle of 45° to the direction of feed of the blanks 12 and the rotation of the files in a climb-cut direction resulted in extremely smooth, cleaned margins.

While the methods and structures shown and described hereinabove represent preferred forms of the invention, it will be readily apparent that many variations may be made in such methods and structures without departure from the scope and spirit of the invention as defined in the appended claims.

We claim:

1. Workpiece edge cleaning apparatus for use in the preparation of thin metallic blanks, said apparatus comprising means for conveying the blanks along a predetermined path of movement, rotatably mounted adjacent said path of movement and extending at least partially into said path for contacting an edge portion of each of the blanks in transit along said path, and motive means coupled to said rotary milling means for rotating said milling means in a direction to provide climb-cutting of the said blank edge portion by said milling means.

2. Apparatus according to claim 1 wherein said rotary milling means comprises a rotatable file member mounted for rotation about an axis extending therethrough and forming an acute angle with the direction of movement of said edge portion proximate said milling means.

3. Apparatus according to claim 1 wherein said means for conveying comprises blank guide means disposed along said path of movement, said path of movement of said blanks extending between said milling means and said blank guide means, and said guide means having a relieved area opposite said milling means for allowing flexure of a portion of said blanks into said relieved area by said milling means.

4. Apparatus according to claim 3 wherein said milling means comprises first and second rotary file members for climb-cutting edge portions disposed on opposite faces of said blank, said blank guide means comprising means for contacting said opposite faces, and a further relieved area, and first-mentioned relieved area and said further relieved area each lying opposite one of said first and second rotary file members for allowing flexure of a portion of said blanks into said relieved areas by said file members during passage of a blank edge portion between said file members and oppositely disposed relieved areas.

5. Apparatus according to claim 1 wherein said motive means comprises means for rotating said rotary milling means at free running speeds in excess of 25,000 R.P.M. and said means for conveying the blanks comprises means for moving the blanks past said rotary milling means at speeds in excess of 1,500 inches per minute.

6. Apparatus according to claim 1 wherein said rotary milling means comprises rotatable file means mounted for rotation about an axis extending therethrough and forming an acute angle with the direction of movement of said edge portion proximate said milling means for cleaning said edge portion in a climb-cut direction partially transverse to the direction of movement of said edge portion, said means for conveying comprising blank guide means disposed along said path of movement and defining a relieved area opposite said rotatable file means for allowing flexure of a portion of said blanks into said relieved area by said rotatable file means to assure a relatively constant shallow clean cut.

7. Workpiece edge cleaning apparatus for use in the preparation of thin metallic blanks, said apparatus comprising means for conveying the blanks along a predetermined path of movement, rotary milling means in the form of a rotary file member extending into said path of movement for contacting an edge portion of a workpiece in transit therepast, said rotary file member being mounted for rotation about an axis thereof forming an acute angle with the direction of blank movement adjacent the milling means, and motive means coupled to said file member for rotating said milling means about said axis to cut said edge portion partially transverse to the direction of movement thereof, said conveying means including workpiece edge guide and support means defining a relieved area opposite said said rotary file member for allowing flexure of said edge portion upon application of cutting pressure by said file member, whereby a relatively light cutting pressure is maintained between the contacting portions of said workpiece and said rotary file member.

8. Apparatus according to claim 7 further comprising a second rotary file member extending into said path of movement for contacting an edge portion of the workpiece on the face of the workpiece opposite the face contacted by said first-mentioned rotary file member and mounted for rotation about an axis thereof forming an acute angle with the direction of blank movement adjacent said second rotary file member and said edge guide and support means comprising a second relieved area opposite said second rotary file member for allowing flexure of the further edge portion upon application of cutting pressure by said second file member.

9. Apparatus according to claim 7 wherein said motive means comprises means for rotating said milling means at free running speeds in excess of 25,000 R.P.M. and said means for conveying the blanks comprises means for moving the blanks past said rotary milling means at speeds in excess of 1,500 inches per minute.

10. Workpiece edge cleaning apparatus for use in the preparation of thin metallic blanks, said apparatus comprising means for conveying the blanks along a predetermined path of movement, rotary milling means in the form of a rotary file extending into said path of movement for contacting and cleaning an edge portion of the blank in transit therepast, said rotary file being angularly mounted with respect to the direction of movement of the blank edge portion for rotation about an axis forming an acute angle with said direction of movement, rotary motor means coupled to said file for rotating said file about an axis in a rotary direction to provide climb-cutting of said edge portion partially transverse to said direction of movement.

11. Apparatus according to claim 10 wherein said conveying means comprises edge portion guide means defining a relieved area opposite said file for accommodating flexure of said edge portion upon application of cutting pressure thereto by said file.

12. Workpiece edge cleaning apparatus for use in the preparation of thin resilient metallic blanks, said apparatus comprising means for conveying the blanks along a predetermined path, rotary blank edge portion surface contacting means extending into said path of movement for contacting said blanks along an edge portion surface in transit therepast, means for accommodating flexure in an edge portion of said blanks, and said surface contacting means being mounted to apply cleaning pressure to said edge portion surface and to flex said blank edge portion into said means for accommodating flexure, whereby said blanks are resiliently biased into contact with said surface contacting means along the edge portion surface thereof.

13. Apparatus according to claim 12 wherein said conveying means comprises blank support and guide means, said means for accommodating flexure comprising relieved areas defined by said support and guide means opposite said path of movement from said contacting means for allowing flexure of blank edge portions into said relieved areas upon contacting said edge surface contacting means.

14. Workpiece edge cleaning apparatus for use in the preparation of generally flat rectangular metallic can body blanks, said apparatus comprising means for conveying said blanks serially along a predetermined path, rotary milling means including four rotary file members, a first two of said file members being mounted adjacent one side of said predetermined path and spaced longitudinally along said path for contacting opposite faces along one edge of blanks in transit along said path, the remaining two of said four file members being mounted adjacent said path at the opposite side thereof from said first two file members and spaced longitudinally along said path for contacting opposite faces along a further edge of blanks in transit along said path, motive means for imparting rotary motion to each of said file members, guide means for contacting said blanks for maintaining said blanks within said path, and flexure accommodating means for allowing flexure of said blanks upon the contacting thereof with said file members to provide a resilient biasing of said blank edges into contact with said file members.

15. Apparatus according to claim 14 wherein each of said four rotary file members are mounted for rotation about an axis thereof forming an acute angle with the direction of movement of said blanks to cut each of the edge surfaces partially transverse to the direction of movement thereof.

16. Apparatus according to claim 14 wherein said motive means comprises means for rotating each of said four rotary milling means in a direction to provide climb-cutting of the four blank edge surfaces by said rotary milling means.

17. The method of cleaning thin metallic blanks comprising the steps of conveying a blank along a predeternimed path, providing a file member, contacting the file member with an edge portion surface of the blank during movement of the blank along the predetermined path and rotating the file member in a direction to provide climb-cutting of the blank edge portion surface.

18. The method according to claim 17 wherein said step of contacting comprises aligning the file member with the blank to form an acute angle between the axis of rotation thereof and the direction of travel of the blank.

19. The method of edge cleaning thin metallic blanks comprising the steps of supporting and conveying a blank along a predetermined path, providing a file member, contacting the file member with a temporarily unsupported edge portion surface part of the blank during movement of the blank to provide flexure of the unsupported part of the blank and resilient biasing of the blank edge surface into contact with the file member, and rotating the file member to provide cutting of the blank edge surface in contact therewith.

20. The method according to claim 19 wherein said step of rotating the file member includes rotating the file member in a direction to provide climb-cutting of the blank edge portion surface in contact with the file member.

21. The method according to claim 19 wherein the said step of rotating the file member includes aligning the file member with the blank to form an acute angle between the axis of rotation thereof and the direction of travel of the blank.

22. The method according to claim 19 wherein the step of providing a file member includes providing four file members, and wherein the steps of contacting and rotating include contacting each of the four file members with a separate edge portion surface of the blank during the movement thereof along the predetermined path and rotating each of the four file members during the contacting thereof with the blank edge portion surfaces.

PO-1050
(5/69)

UNITED STATES PATENT OFFICE
CERTIFICATE OF CORRECTION

Patent No. 3,528,338          Dated    September 15, 1970

Inventor(s) ANTHONY J. CUMA and KENNETH W. MAURER

It is certified that error appears in the above-identified patent and that said Letters Patent are hereby corrected as shown below:

Column 5, line 71, read as -- movement, rotary milling means rotatably mounted adjacent said path of move- --
Column 6, line 19, read "and" (second occurrence) as -- said -- .

Signed and sealed this 26th day of December 1972.

(SEAL)
Attest:

EDWARD M. FLETCHER, JR.
Attesting Officer

ROBERT GOTTSCHALK
Commissioner of Patents